(12) United States Patent
Bagavath-Singh

(10) Patent No.: US 8,878,094 B2
(45) Date of Patent: Nov. 4, 2014

(54) PART-GEOMETRY INDEPENDENT REAL TIME CLOSED LOOP WELD POOL TEMPERATURE CONTROL SYSTEM FOR MULTI-LAYER DMD PROCESS

(75) Inventor: Vijayavel Bagavath-Singh, Rochester Hills, MI (US)

(73) Assignee: DM3D Technology, LLC, Troy, MI (US)

( * ) Notice: Subject to any disclaimer, the term of this patent is extended or adjusted under 35 U.S.C. 154(b) by 1951 days.

(21) Appl. No.: 10/525,938

(22) PCT Filed: Aug. 28, 2003

(86) PCT No.: PCT/US03/27089
§ 371 (c)(1),
(2), (4) Date: Aug. 23, 2005

(87) PCT Pub. No.: WO2004/020139
PCT Pub. Date: Mar. 11, 2004

(65) Prior Publication Data
US 2006/0032840 A1    Feb. 16, 2006

Related U.S. Application Data

(60) Provisional application No. 60/406,366, filed on Aug. 28, 2002.

(51) Int. Cl.
*B23K 26/34* (2014.01)
*B23K 15/00* (2006.01)
*B23K 26/03* (2006.01)
*B22F 3/105* (2006.01)

(52) U.S. Cl.
CPC ........... *B23K 15/0086* (2013.01); *B23K 26/032* (2013.01); *B22F 3/1055* (2013.01)
USPC ................................ 219/121.64; 219/121.63

(58) Field of Classification Search
USPC ............... 219/121.6, 121.61, 121.62, 121.78
See application file for complete search history.

(56) References Cited

U.S. PATENT DOCUMENTS 3,991,930 A * 11/1976 Ekerot .......................... 228/263
4,578,561 A    3/1986 Corby, Jr. et al.
(Continued)

FOREIGN PATENT DOCUMENTS

EP          1175950       1/2002
JP          2001-321943   11/2001
WO          WO 01/81031 A1 * 11/2001 .............. B22F 3/105

OTHER PUBLICATIONS

Munjuluri, N. et al., Process Modeling, Monitoring and Control of Laser Metal Forming, Technical Publication—University of Missouri, pp. 235-242, 2000.

*Primary Examiner* — Thien S Tran
(74) *Attorney, Agent, or Firm* — Warner Norcross & Judd LLP

(57) ABSTRACT

In a direct metal deposition system which builds up a metallic overlay on a substrate by moving the substrate relative to a laser in a metallic powder feed, the laser power is adjusted for successive layers by sensing the weld pool in a plurality of selected points in each layer and adjusting the power during successive layers to maintain a weld pool that corresponds to those achieved during deposition of a lower optimal layer. This compensates for heating of the substrate resulting from the deposition which tends to increase the pool size or temperature in the higher layers.

13 Claims, 3 Drawing Sheets

(56) References Cited

U.S. PATENT DOCUMENTS

| | | | |
|---|---|---|---|
| 4,611,111 A | 9/1986 | Baheti et al. | |
| 5,155,321 A | 10/1992 | Grube et al. | 219/121.6 |
| 5,427,733 A * | 6/1995 | Benda et al. | 419/1 |
| 5,453,329 A | 9/1995 | Everett et al. | 428/565 |
| 5,637,175 A | 6/1997 | Feygin et al. | |
| 5,643,478 A | 7/1997 | Dillet et al. | |
| 5,681,490 A * | 10/1997 | Chang | 219/121.64 |
| 5,715,375 A * | 2/1998 | Ito et al. | 700/258 |
| 5,730,817 A | 3/1998 | Feygin et al. | |
| 5,837,960 A * | 11/1998 | Lewis et al. | 219/121.63 |
| 5,908,569 A | 6/1999 | Wilkening et al. | |
| 6,122,564 A * | 9/2000 | Koch et al. | 700/123 |
| 6,180,049 B1 * | 1/2001 | Jang et al. | 264/401 |
| 6,329,635 B1 | 12/2001 | Leong et al. | 219/121.83 |
| 6,398,102 B1 | 6/2002 | Cao et al. | |
| 6,455,803 B1 | 9/2002 | Fields, Jr. et al. | 219/121.63 |
| 6,459,951 B1 * | 10/2002 | Griffith et al. | 700/166 |
| 6,504,127 B1 | 1/2003 | McGregor et al. | 219/121.63 |
| 2002/0062909 A1 | 5/2002 | Jang et al. | |
| 2002/0165634 A1 | 11/2002 | Skszek | 700/118 |
| 2002/0166896 A1 | 11/2002 | Mazumder | 235/487 |
| 2004/0026807 A1 * | 2/2004 | Andersson et al. | 264/40.1 |
| 2004/0251242 A1 * | 12/2004 | Suh | 219/121.63 |

* cited by examiner $LY_n$     LY is the deposition LAYER
$TP_{np}$   TP is the Test point co-ordinates
$IM_{np}$   IM is the Weld pool image size
$LW_a$     Low Range matrix
$MD_a$    Medium Range matrix
$HG_a$    High Range matrix
$WL_{na}$   Layer weight matrix
$WT_{np}$   Layer correction test point weight matrix
$PWR_n$   Laser Power n:  Layer number, where n = 2 to m ; 'm' is last layer of deposition;
p:  Test point co-ordinate number, where p = 1 to q ; 'q' is the last test point co-ordinate
a:  Element number of the Range and Layer Weight matrix, where a = 2 to b; 'b' is the last element
H  Biggest Golden layer test point image size
L:  Smallest Golden layer test point image size
$PWR_1$:  Golden Layer Laser Power
$LY_1$ = Golden layer, $LY_0$ = Base metal contact deposition layer
$LW_1 = MD_1 = HG_1 = WL_{n1} = 1$
MIN, MAX, INC, KCON, LCON, MCON, HCON are Control system constants

STEP1: CREATING RANGE MATRIX (GOLDEN LAYER DATA PROCESSING)

$LW_a = LW_{(a-1)} + (H-L) / LCON$
$MD_a = MD_{(a-1)} + (H-L) / MCON$
$HG_a = HG_{(a-1)} + (H-L) / HCON$ $(H - L) > LCON > MCON > HCON$

STEP2 : CREATING LAYER WEIGHT MATRIX (BY USING PREVIOUS LAYER TEST POINT IMAGE SIZE)

$$WL_{na} = WL_{n(a-1)} - INC - \left( \left[ \sum_{p=1 \text{ to } q} (IM_{np} - IM_{(n-1)p}) \right] / q \right) \cdot KCON$$

If $WL_{na}$ is less than MIN, set [$WL_{na}$ = MIN]

STEP3 - CREATING LAYER CORRECTION
TEST POINT WEIGHT MATRIX (USING GOLDEN LAYER TEST POINT IMAGE SIZE)
$WT_{np} = WL_{na}$

Selection of index 'a' of $WL_{na}$ : If the test point coordinate 'p' in $WT_{np}$ is LOW / MEDIUM / HIGH test point, search for the nearest equivalent of ($IM_{np} - IM_{1p}$) value in LW / MD / HG. Take the corresponding 'a' index number from LW / MD / HG. In cases where the ($IM_{np} - IM_{1p}$) value is greater than all entries in LW / MD / HG, [$WT_{np}$ = MIN] and if ($IM_{np} - IM_{1p}$) value is less than all entries in LW / MD / HG, [$WT_{np}$ = MAX].

STEP4 : CALCULATING NEW LASER POWER FOR THE NEXT LAYER $$PWR_{n+1} = PWR_1 \cdot \left( \left[ \sum_{p=1 \text{ to } q} (WT_{np}) \right] / q \right)$$

PART-GEOMETRY INDEPENDENT REAL TIME CLOSED LOOP WELD POOL TEMPERATURE CONTROL SYSTEM FOR MULTI-LAYER DMD PROCESS

RELATED APPLICATION

This application is a United States national phase of PCT/US03/27089, filed Aug. 28, 2003, which claims priority of U.S. Provisional Patent Application Ser. No. 60/406,366 filed Aug. 28, 2002, both of which are incorporated herein by reference.

FIELD OF THE INVENTION

This invention relates to the fabrication of metal parts by the direct metal deposition of a plurality of relatively thin layers on an underlying substrate, and more particularly to such a system which controls the deposition power used in forming a layer based on parameters generated during the formation of previous layers.

BACKGROUND OF THE INVENTION

Fabrication of three-dimensional metallic components via layer-by-layer laser cladding was first reported in 1978 by Breinan and Kear. U.S. Pat. No. 4,323,756 issued to Brown et al. in 1982, describes a method for the production of bulk rapidly solidified metallic articles of near-net shape, finding particular utility in the fabrication of certain gas turbine engine components including discs and knife-edge air seals. According to the disclosure, multiple thin layers of feedstock are deposited using an energy beam to fuse each layer onto a substrate. The energy source employed may be a laser or an electron beam. The feedstock employed in the practice of the invention may be either a wire or powder material, and this feedstock is applied to the substrate in such a fashion that it passes through the laser beam and fuses to the melted portion of the substrate.

These methods of direct metal deposition may make use of multi-axis, commercially available CNC machines for the fabrication of three-dimensional components. U.S. Pat. No. 5,837,960 relates to a method and apparatus for forming articles from materials in particulate form. The materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

Most existing techniques, however, are based on open-loop processes requiring either a considerable amount of final machining to achieve a part of close dimensional tolerances. Continuous corrective measures during the manufacturing process are necessary to fabricate net shape functional parts with close tolerances and acceptable residual stress. A closed loop system which achieves these goals is described in U.S. Pat. No. 6,122,564. This patent discloses a laser-aided, computer-controlled direct-metal deposition, or DMD, system wherein successive layers of material are applied to a substrate so as to fabricate an object or to provide a cladding layer.

In contrast to previous methodologies, this DMD system is equipped with feedback monitoring to control the dimensions and overall geometry of the fabricated article in accordance with a computer-aided design (CAD) description. The deposition tool path is generated by a computer-aided manufacturing (CAM) system for CNC machining, with post-processing software for deposition, instead of software for removal as in conventional CNC machining. Such feedback controlled systems may totally eliminate intermediate machining and reduce final machining considerably.

U.S. Pat. No. 6,518,541 discloses a direct metal deposition system employing a laser having an on/off duty cycle and means for controlling the process parameters through feedback to maintain the duty cycle within a desired range. U.S. Pat. No. 6,459,951 relates to a DMD system employing feedback control of the system parameters to maintain a constant well pool as the deposition progresses on a particular layer.

These feedback control systems improve the precision of each layer of the multi-layer fabrication process but do not address the problem of layer-to-layer variations which result from heating of the substrate as the DMD process progresses.

SUMMARY OF THE INVENTION

The present invention is directed toward a multi-layer deposition process which employs feedback control and an adaptive system to control the laser power used during formation of a layer based on parameters sensed during the formation of previous layers.

During deposition, a certain percentage of the energy delivered by the laser is absorbed by the substrate, which increases substrate temperature. Repeated deposition leads to steady increase in the substrate temperature until it stabilizes at a particular value. At this point, the loss of heat from the substrate is at its maximum and hence further absorption of laser energy increases the weld pool temperature and size. The increase in the size of the weld pool deleteriously affects the deposition uniformity.

The present invention is directed toward an adaptive, closed loop system in which the weld pool size or temperature is sensed using a video image, or alternatively a pyrometer, and the sensed value is provided to a numerical processor which adjusts the process laser power for each layer. The adjustment algorithm operates to maintain the same pool size or temperature at a particular point in each layer as the size or temperature of that point in underlying layers.

In a preferred embodiment of the present invention, this laser power feedback mechanism is not employed during the deposition of the first layer overlying the substrate since the thermal conduction conditions and accordingly the pool temperature for that layer will differ substantially from those values for subsequently deposited layers. For the second layer, or a higher layer depending upon design parameters, a number of test point coordinates are selected along the layer surface. The number of test points considered depends on the area of deposition, the part geometry, and the processing speed of the CPU running the algorithm. As the second layer or other chosen layer is deposited, the pool size or temperature for each test point is sensed and stored. This layer may be termed the "Golden Layer" since the values for the pool size or temperature measured at each test point during the deposition of this layer are considered the target values for the deposition parameters at corresponding test point coordinates in subsequently deposition layers.

In a preferred embodiment, the weld pool image is captured at different test points during deposition of the Golden Layer using CCD cameras and each test point's well pool size is determined by analysis of the images. The values stored for each test point are then categorized as low, medium or high points according to the difference between the individual pool sizes. A two-dimensional "Range Matrix" is then created for the values at each test point using the difference between the high and the low points image size. Next, without changing the laser power, the next layer is deposited and test point weld pool images are captured. The image size matrix for this layer is calculated and compared with the matrix for the previous layer to calculate a "Layer Weight" matrix. Next, that layer's image size matrix is compared to the Golden Layer image size matrix and the difference calculated. The difference in size is used with the Range matrix and corresponding weight value selected from the layer weight matrix for each test point and a layer correction test point weight matrix is established. By applying that matrix to the Golden Layer laser power, a new laser power value is calculated for the next deposition layer. This process is repeated for each subsequent layer.

As a result of this process, the pool size for a particular X-Y point on a layer is controlled to best approximate the pool size for that point on the Golden Layer.

Other objects, advantages and applications will be made apparent by the following detailed description of a preferred embodiment of the invention. The description makes reference to accompanying drawings in which:

BRIEF DESCRIPTION OF THE DRAWINGS

FIG. 4 is a chart of the algorithms used in the preferred embodiment of the invention.

DETAILED DESCRIPTION OF THE PREFERRED EMBODIMENT OF THE INVENTION

Figure 1:
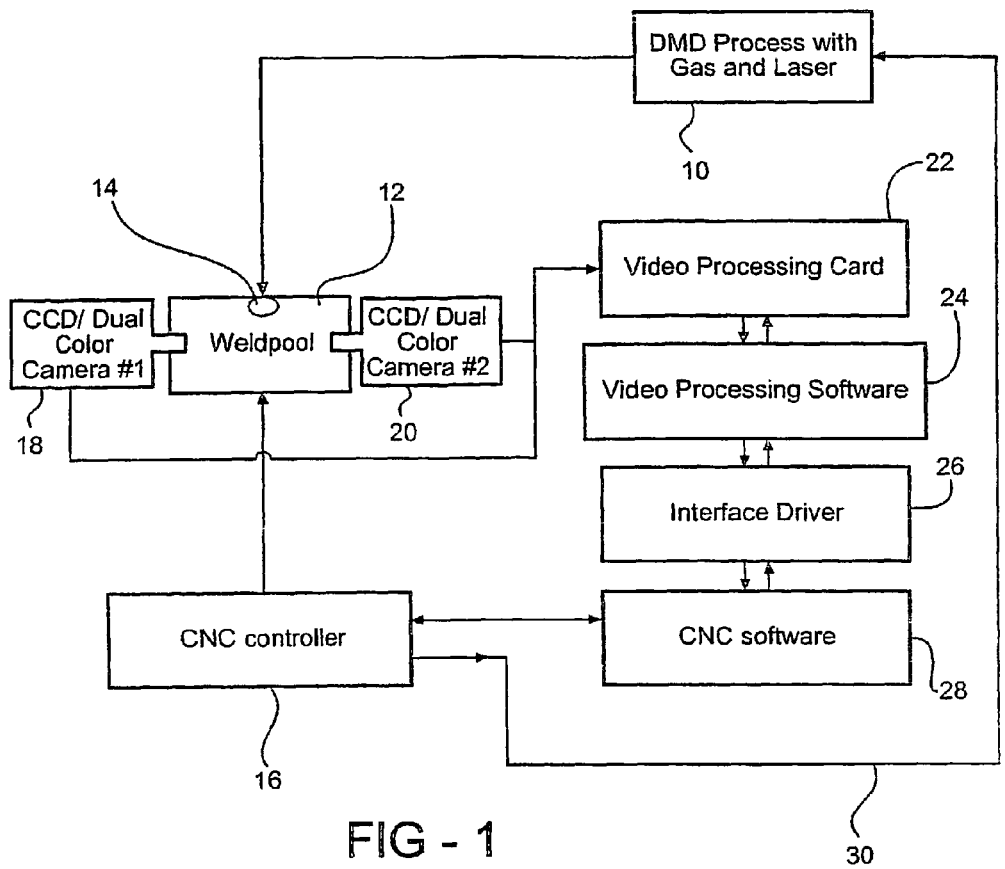
FIG. 1 is a schematic diagram of a direct metal deposition system for the practice of the present invention.

A preferred embodiment of the invention, illustrated schematically in FIG. 1, employs a head 10 consisting of a power laser and gas propelled metal powder dispenser to produce a weld pool 14 at a point on a substrate 12. This apparatus is of the type employed in the prior art such as disclosed in U.S. Pat. No. 6,122,564. Wire may be fed into the laser beam as an alternative to dispensing powder and an electron beam may be used as an alternative to the laser beam. The terms "laser" and "powder" as used hereinafter should be considered to include these alternatives.

The substrate 12 is moved relative to the head 10 by a CNC controller 16 over a programmed path so that the weld pool follows the path along the substrate so as to create a metallic layer on the substrate. A pair of CCD cameras 18 and 20 are supported on the machine worktable so as to generate images of the weld pool 14 from two opposed sides. This is necessary in case the weld pool is formed in such a way as to block the view from one of the cameras.

In alternative embodiments of the invention, rather than imaging the weld pool to determine its size, the weld pool temperature could be measured by one or more pyrometers. The weld pool size and temperature are closely related to one another.

The outputs of the cameras 18 and 20 are provided to a video processing card 22 which uses video processing software 24 to perform the operations which will be hereinafter described. An interface driver 26 couples the video processing software 24 to the CNC software 28 which provides drive signals to the CNC controller 16 and through line 30 sends a power control signal to the laser within the head 10.

Figure 2:
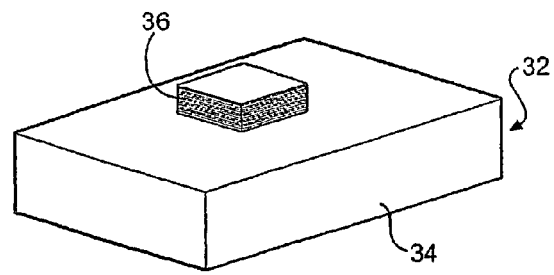
FIG. 2 is a view of a typical part which may be formed by the method and apparatus of the present invention.

FIG. 2 illustrates a typical workpiece generally indicated at 32, which includes an underlying metallic substrate 34 with a DMD deposited section 36 formed by a plurality of layers on its upper surface. As the initial layers of the deposited volume 36 are formed, much of the thermal energy of the laser goes to heating the underlying metallic substrate 34. As the deposition continues, the substrate reaches a maximum temperature and thereafter additional laser power goes to melting the powdered metal in previously deposited areas. If constant laser power were applied to each area, the weld pool size would begin to grow as the substrate 34 heats up producing an irregular deposition pattern. The present invention compensates for this phenomenon.

The broad method of the present invention is to choose initial laser power based on conventional empirical considerations and deposit at least the first two layers of the section 36. No measurements are made of pool size during deposition of the first layer because its contact with the substrate 34 creates thermal properties that are unlike any of those encountered in the deposition of subsequent layers. During the deposition of the second layer (or alternatively a higher layer, such as the third layer, depending upon the metallurgy of the substrate 34 in the deposited segment 36), measurements will be made of the weld pool size at selected coordinates as the deposition progresses. These values are stored in video processing software 24. Broadly, measurements will be made of the weld size at the same selected coordinates as successive layers are formed and the measurements of weld size at a particular layer will be processed in connection with the stored matrices representing the weld sizes at previous layers to determine a suitable laser power for use in the deposition of the next layer. These power adjustments from layer to layer are broadly intended to compensate for effects of heating of the substrate on the weld pool size.

The weld pool image is the basic input for the control system and contains temperature information relating to the weld pool. Weld pool temperature information is extracted from the weld pool image by determining the image brightness level and its area and is called "weld pool size." By controlling the laser power, the weld pool size is controlled and hence the weld pool temperature, thus making a closed-loop feedback system. The system is made self-learning or adaptive by applying the previous layer image information to future layer laser power corrections.

Each selected coordinate of the deposition geometry of each layer is considered a separate Test Point. Each Test Point coordinate may have a different image size due to the geometry constraints. Weld pool image size for a point on a flat surface may be different from a point on an inclined surface. Also, even on a flat surface, a weld pool image size for a compressed tool-path section will be different from an edge coordinate's weld pool image size. The adaptive closed-loop weld pool temperature control system design considers all of the above situations to make it robust.

Figure 3:
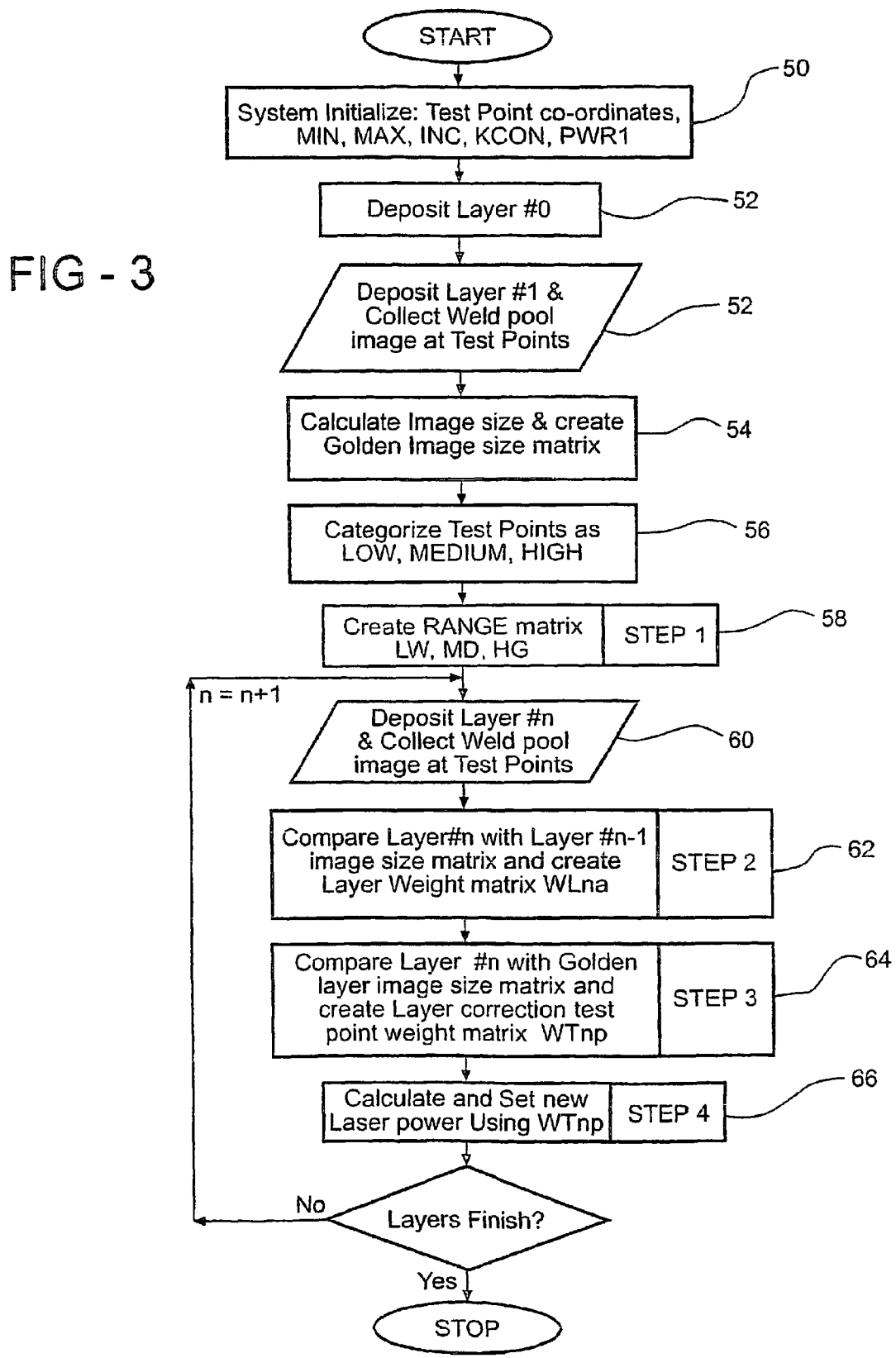
FIG. 3 is a flowchart of a preferred method of operation of the present invention.

FIG. 3 illustrates the control flow of the preferred embodiment of the adaptive closed-loop weld pool temperature control system. At box 50 the operator enters initialization information. These include Test Point coordinates on the part geometry. The number of Test Points considered depends on the area of deposition and processing speed of the CPU running the algorithm. On a relatively large, flat part, the Test Point coordinates can be fairly widely spaced while changes in the contour of the part require closer spacing of the coordinates.

MIN and MAX represent the coordinates of the beginning and ending Test Points. INC represents the increment between Test Points. KCON is a control system constant relating to the matrix values. PWR1 is the initial laser power.

Having chosen these initializing values, the first layer is deposited via inbox 52. This is the layer in direct contact with the substrate 34 and no pool size measurements are made during its deposition. Next, in box 54 the second layer is deposited and the weld pool image is calculated at the Test Point coordinates during this deposition. This layer is called the "Golden Layer" since the information collected during this layer is considered as the optimal solution to corresponding Test Point coordinates in future layers. The temperature of the substrate during the deposition of the Golden Layer is considered to be at its minimal when compared with the substrate temperature in future layers. So this layer is considered as the best deposition layer. The weld point image is captured at the different Test Points using the CCD cameras 18 and 20 and each point's weld pool size is determined by the video processing software 24.

Golden Layer Test Point weld pool image sizes are compared with each other and Test Points are categorized as LOW, MEDIUM or HIGH points according to the difference in individual size. This is done in boxes 54 and 56. At block 58 a RANGE matrix is created for layer one, the Golden Layer. The RANGE matrix is created for LOW, MEDIUM and HIGH points, using the difference between the high and low points image size. The LOW points RANGE matrix will have shorter value distribution when compared to HIGH points RANGE matrix distribution. Once the RANGE matrix is created, computation for the initial or Golden Layer computation is complete. The equations and algorithms used for this computation and the other computations are illustrated in FIG. 4. Then the next layer is deposited without changing the laser power and Test Point weld pool images are captured. The weld pool size matrix is calculated as previously and this layer's image size matrix is compared with the previous layer image size matrix and $wl_{2_a}$ is calculated using the equation set forth in FIG. 4. This is all illustrated in blocks 60 and 62 of FIG. 3. Next, in block 64 the layer number two image size matrix is compared with a Golden Layer image size matrix and the difference is calculated. The difference in size is used with RANGE matrix and corresponding weight values selected from $wl_{2_a}$ for every Test Point and $wt_{2_p}$ is created using the equation for step three set forth in FIG. 4. Finally, by applying $wt_{2_p}$ to the Golden Layer laser power $pwr_1$, a new laser power value is calculated. The new laser power is set at the laser generator 10 through an analog signal link. This is illustrated in block 66. The process of blocks 60, 62, 64 and 66 is repeated for subsequent layers until the last layer is complete and the part is completed.

It should be recognized that other specific equations could be used to achieve the broad goal as set forth herein and defined in the appended claims.

It should also be recognized that direct temperature measurements may be made to determine the weld pool temperature rather than the measurements based upon the weld pool size.

Having thus described my invention, I claim:

1. A method of forming a metal section on a metal substrate by depositing a plurality of superimposed layers comprising the steps of:
    utilizing a laser generating a heating beam and a powdered metal source operative to feed metal powder into the beam and moving the substrate relative to the beam under numerical control over a programmed path to provide advancing melt pool layers;
    providing a first melt pool layer and not sensing parameters of the first melt pool layer for reducing an effect of thermal conduction by the metal substrate upon sensed parameters and providing a second melt pool layer over the first melt pool layer and sensing parameters of the second melt pool layer at a plurality of selected coordinates during the generation of a plurality of metallic layers;
    storing the sensed parameters of the second melt pool layer at each of the selected coordinates; and
    processing the stored parameters to determine an appropriate laser power for use during the deposition of a melt pool layer applied subsequent to the second melt pool layer and adjusting the power of the heating beam based upon the sensed parameters of the second melt pool layer to account for heat retained by the metal substrate.

2. The method of claim 1 wherein processing the stored parameters comprises comparing a matrix of the sensed parameters stored during formation of the last layer deposited with the matrix of the sensed parameters of an earlier deposited layer to determine an appropriate laser power for use during the deposition of the next layer.

3. The method of claim 2 wherein the earlier deposited layer constitutes the second layer deposited over the substrate.

4. The method of claim 1 wherein the sensed parameters of the pool comprise the dimensions of the pool.

5. The method of claim 1 wherein the sensed parameters of the pool comprise the optical intensity of the pool.

6. The method of claim 1 wherein the sensed parameters of the pool comprise the dimensions of the pool and the optical intensity of the pool.

7. The method of claim 1 wherein the sensed parameters of the melt pool comprise the temperature of the melt pool.

8. A method of forming a metal section on a metal substrate by depositing a plurality of superimposed layers comprising the steps of:
    utilizing a power source generating a heating beam and a metal source operative to feed metal powder into the beam and moving the substrate relative to the beam over the section to provide an advancing first layer of a melt pool;
    providing a second layer of a melt pool over the first layer of the melt pool and sensing parameters of the second layer of the melt pool at a plurality of selected coordinates while not sensing parameters of the first melt pool layer for reducing an effect of thermal conduction by the metal substrate upon sensed parameters during the generation of a plurality of metallic layers;
    storing the sensed parameters of the second layer of the melt pool at each of the coordinates; and processing the stored parameters to determine an appropriate laser power for use during deposition of a subsequent layers of a melt pool, and adjusting laser power used to provide the subsequent layers of the melt pool based upon sensed parameters of a previous layer of the melt pool.

9. The method of claim 8 wherein the power source is a laser.

10. The method of claim 8 wherein the power source is an electron beam.

11. The method of claim 8 wherein the power beam level is maintained at a constant during generation of each layer.

12. A method of forming a metal section on a metal substrate by depositing a plurality of superimposed layers comprising the steps of:
    utilizing a heating beam and a powdered metal source operative to feed metal powder into the beam and moving the substrate relative to the beam under numerical control over a programmed path to provide an advancing melt pool;

depositing a first layer of a melt pool in contact with the substrate using a first heating beam power;

depositing a second layer of a melt pool over the first layer of the melt pool using the same heating beam power as used to deposit the first layer of the melt pool, not sensing parameters of the first melt pool layer for reducing an effect of thermal conduction by the metal substrate upon the sensed parameters and sensing parameters of the second layer of the melt pool at a plurality of selected coordinates during the generation of the second layer of the melt pool;

depositing a third layer of a melt pool while adjusting the power of the heating beam based upon sensed parameters of the second layer of the melt pool and sensed parameters of the third layer of the melt pool; and using stored parameters of the melt pool during generation of the second and third layer of the melt pool to determine an appropriate heating beam power for use during deposition of subsequent layers of the melt pool.

13. The method of claim 12 whereas each subsequent layer is deposited, the parameters of the melt pool are sensed at said plurality of selected coordinates and are used, along with previously stored sensed parameters, to determine the heating beam power for subsequent layers.

* * * * *